United States Patent [19]

Hogarth et al.

[11] Patent Number: 5,397,929
[45] Date of Patent: Mar. 14, 1995

[54] INTEGRATED OUTLET FOR COMMUNICATIONS AND ELECTRICAL POWER

[75] Inventors: Peter Hogarth, Fairfield, Iowa; Kurt Swenson, Lexington, Ky.; Charles E. Gutenson; Edward L. Nichols, III, both of Annapolis, Md.

[73] Assignee: Building Technology Associates, Wilmington, Del.

[21] Appl. No.: 38,068

[22] Filed: Mar. 29, 1993

Related U.S. Application Data

[63] Continuation of Ser. No. 299,192, Jan. 19, 1989, abandoned.

[51] Int. Cl.⁶ .................. H01R 9/07; H01R 13/70; H01H 45/04
[52] U.S. Cl. ................................. 307/140; 307/40; 307/147; 361/171; 439/535; 439/620
[58] Field of Search ............... 439/653, 654, 540, 535, 439/639; 174/53, 54–58; 333/1, 100, 260; 375/36; 379/397, 332; 367/1-3, 18–22, 25, 26, 28, 38–40, 42, 43, 51, 72–76, 85, 86, 112, 113, 145, 147, 141, 140; 340/310 R, 310 A, 310 CP, 825.06, 825.07, 825.22; 220/3.2–3.94; 361/171, 172, 331, 600

[56] References Cited

U.S. PATENT DOCUMENTS

| 3,558,902 | 1/1971 | Casey | 307/3 |
|---|---|---|---|
| 3,842,320 | 10/1974 | Kiesling | 307/155 |
| 4,215,276 | 7/1980 | Janeway | 307/40 |
| 4,418,333 | 10/1983 | Schwarzbach et al. | 340/310 A |
| 4,454,509 | 6/1984 | Buennagel et al. | 340/825.69 |
| 4,538,073 | 8/1985 | Freige et al. | 307/33 |
| 4,636,914 | 1/1987 | Belli | 361/331 |
| 4,758,536 | 7/1988 | Miller et al. | 439/138 |
| 4,870,863 | 10/1989 | Duncan et al. | 73/431 |
| 4,899,129 | 2/1990 | MacFadyen et al. | 340/310 R |
| 4,899,217 | 2/1990 | MacFadyen et al. | 358/86 |
| 5,117,122 | 5/1992 | Hogarth et al. | 307/140 |

FOREIGN PATENT DOCUMENTS 119187 3/1984 European Pat. Off. .

OTHER PUBLICATIONS

Article entitled "Smart House", Jan., 1986, (pp. 1–19).
John A. Edgar, article entitled "Closed Loop Programmable Power-A Smart House Innovation" 1987, (pp. 357–361).
Arvo Lannus, "Inside Smart House", EPRI Journal, Nov. 1986.
Article entitled "Most Revolutionary Change in Housing Since Indoor Plumbing" reprinted from Proffessional Builder, Dec. 1986.

*Primary Examiner*—A. D. Pellinen
*Assistant Examiner*—Fritz M. Fleming
*Attorney, Agent, or Firm*—Cushman, Darby & Cushman

[57] ABSTRACT

The present invention relates to an integrated outlet that allows supply of AC power to an outlet receptacle when certain conditions are satisfied. The integrated outlet contains separate modules establish electrical connection with electrical conductors that transmit AC and DC power, telecommunications, control communications, and signals transmitted along a coaxial wire. In a preferred embodiment, these electrical conductors are all disposed on a single ribbon cable. Each module within the integrated outlet can attach to only certain conductors to increase safety in the resulting system.

24 Claims, 5 Drawing Sheets

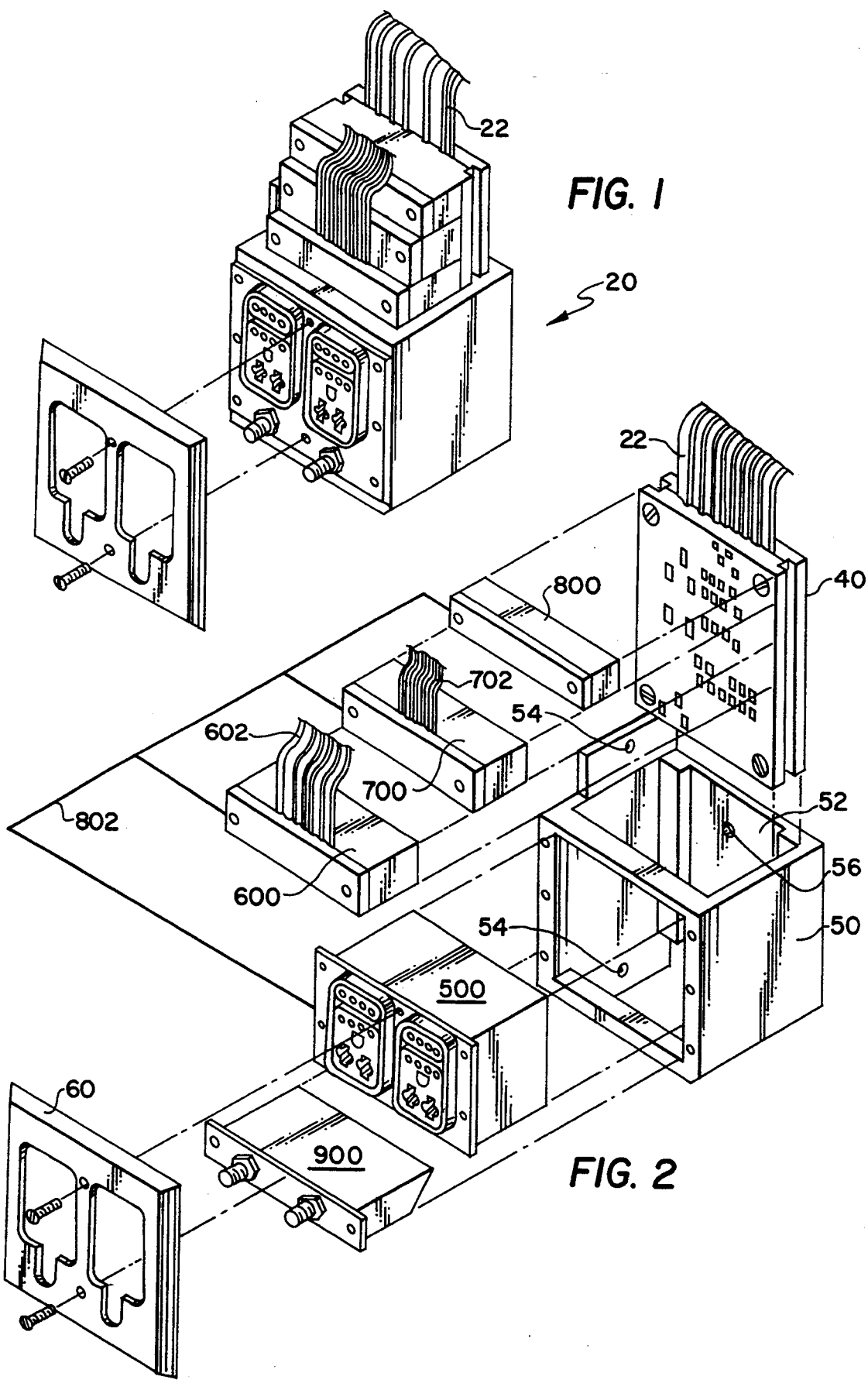

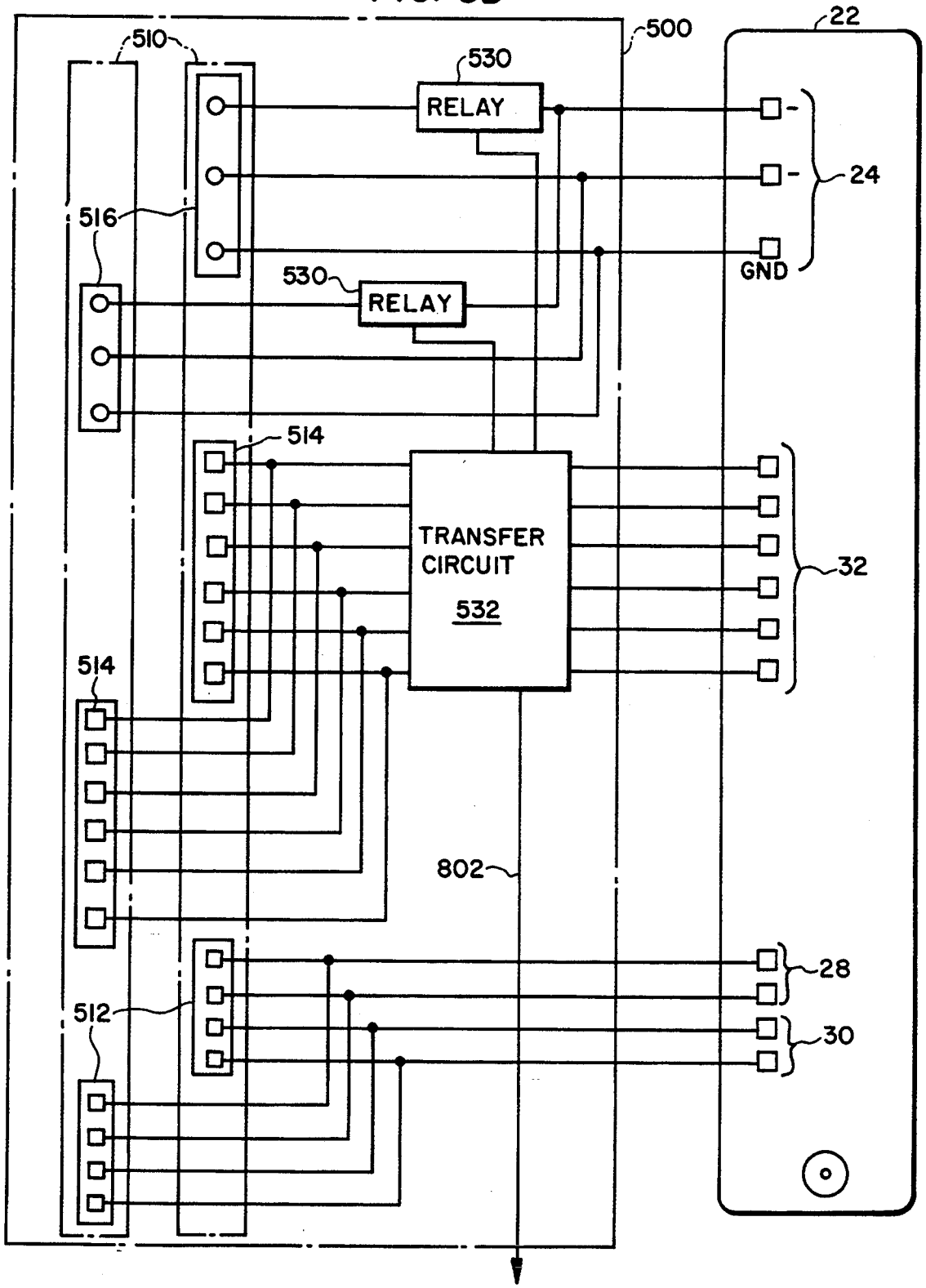

INTEGRATED OUTLET FOR COMMUNICATIONS AND ELECTRICAL POWER

This is a continuation of application Ser. No. 07/299,192, filed on Jan. 19, 1989, abandoned.

BACKGROUND OF THE INVENTION

1. The Field of the Art

The present invention relates to an integrated outlet that allows external appliances to be attached to electrical power and communications lines.

2. Description of the Prior Art

Various types of outlets are known for establishing electrical connection with AC and DC power. Similarly, outlets are known for establishing communications with digital communications lines.

In order to make installation of wiring in homes simpler, it has been proposed to install a cable having a multitude of conductors that can supply both electrical power and communications signals to various parts of a building, such as a house. In order to access the power and communications signals that are transmitted along a cable such as this, a special type of outlet is necessary.

An example of one type of proposed outlet exists in U.S. Pat. No. 4,758,536. This outlet provides a simple way of establishing an electrical connection to a ribbon cable containing various conductors that transmit both power and communications signals. However, this outlet only provides a simple connection, so that an external device can be connected to the receptacles. Thus, the 120 V AC or 240 V AC power that is transmitted along the line is also always transmitted to the receptacle. Thus, because the power receptacle is always "hot", an electrical short can easily occur.

Furthermore, it is necessary to attach many appliances, switches and sensors directly to the cable containing power and communications conductors rather than through an external receptacle in a convenient and standardized format.

Thus a new outlet that can establish electrical connections in various ways to a cable having both power and communications conductors is necessary.

SUMMARY OF THE INVENTION

It is an object of the present invention to provide an integrated outlet that establishes electrical connection to a cable containing a plurality of conductors and transmits electrical power and communications signals.

It is another object of the present invention to provide an integrated outlet that maintains closed loop AC power to insure safety of the system.

It is a further object of the present invention to provide a plurality of standardized modules insertable into the integrated outlet that can establish connection between various conductors on the ribbon cable.

It is still a further object of the invention to provide uninterruptable 5 V DC power to each of the standardized modules in the integrated outlet. In order to attain the above recited objects of the invention, among others, the integrated outlet of the present invention has a lighting power module, a switch/sensor module, a duplex power and communications module, and an uninterruptable power supply module, that all are attached to a tap that surrounds a cable, preferably a ribbon cable, containing the power and communications conductors. A coaxial tap provides connection to a coaxial cable on this cable having a plurality of conductors.

Placement of the integrated outlet at many locations in a building is possible and multiple integrated outlets can be connected to the same ribbon cable.

The lighting power module accesses AC and DC power and communications signals to a separate ribbon cable that can be run to a location external from the integrated outlet. The switch/sensor module accesses communications signals and DC power, but not AC power, to a separate ribbon cable that can be run to a location external from the integrated outlet. The duplex power and communications module contains external receptacles for attachment of appliances to AC power, communications, and telecommunications. The uninterruptable power supply module supplies 5 V DC power to each of the other modules in the integrated outlet.

Thus, these standardized modules allow the transmission of electrical power and communications in a variety of different ways from an integrated outlet. Thus, a safe, economical, and cost effective device is obtained.

BRIEF DESCRIPTION OF THE DRAWINGS

These and other advantages of the present invention may be appreciated from studying the following detailed description of the preferred embodiment together with the drawings in which:

FIG. 1 illustrates a perspective view of the integrated outlet according to the present invention;

FIG. 2 illustrates an exploded perspective view the integrated outlet according to the present invention;

FIGS. 5A-5D illustrate the duplex power and communication module of the integrated outlet according to the present invention;

DETAILED DESCRIPTION OF THE PREFERRED EMBODIMENT

FIG. 1 illustrates a perspective view of integrated outlet 20, which is shown in exploded view in FIG. 2. Integrated outlet 20 provides a single unit that establishes electrical contact with power conductors such as 120 V AC and 12 V DC, communication conductors, telecommunication conductors, and coaxial conductors in a safe and efficient manner.

Figure 4:
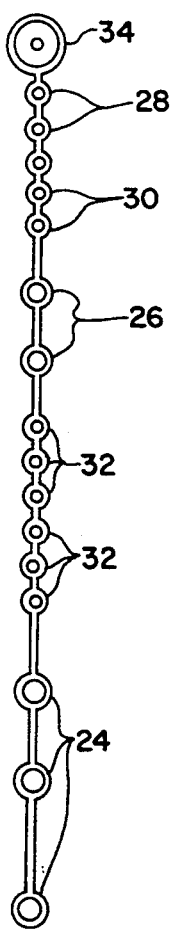
FIG. 4 illustrates a ribbon cable that can be used with the integrated outlet according to the present invention.

FIG. 4 illustrates ribbon cable 22 that is the preferred mode of transferring various types of electrical signals to integrated outlet 20. However, other combinations of separate conductors could be used to perform the equivalent function of ribbon cable 22. In the preferred embodiment of ribbon cable 22 shown in FIG. 4, three #14 gauge wires 24 provide 120 V AC, 15 amp, power. However, if 120 V AC, 20 amp, power was required, a heavier wire could be used. If 240 V AC power was wanted, one additional gauge wire 24 could be introduced. Two #18 parallel, untwisted gauge wires 26 provide 12 V DC power. Telephone line 28 and telephone line 30 provide a conductive path for telecommunications along ribbon cable 22 and a shield wire is disposed between the telephone lines. Six control communications wires 32, made of #24 gauge untwisted copper wire provide a conductive path for digital control communications. Coaxial wire 34 can be used, for example, to transmit television signals along ribbon cable 22. These various wires are accessed by separate modules within integrated outlet 20, which will now be summarily described with reference to FIG. 2.

Tap 40 holds ribbon cable 22, and contains a plurality of pin insert holes 42. Duplex power and communications module 500, lighting power module 600, switch/sensor module 700, and uninterruptable power supply module 800 each contain pins, described in more detail hereinafter, that project into pin insert holes 42 and establish an electrical path to ribbon cable 22.

Uninterruptable power supply module 800 converts the 12 V DC power that is supplied on parallel, untwisted gauge wires 26 into 5 V DC power. This 5 V DC power is supplied to switch/sensor module 700, lighting power module 600, and duplex power and communications module 500 along uninterruptable power line 802. This 5 V DC power is necessary to operate communications transfer circuits, preferably in integrated circuit chip form, that exist within each of switch/sensor module 700, lighting power module 600, and duplex power and communications module 500.

In the preferred embodiment of the invention, uninterruptable power supply module 800 is in a physically separate housing from switch/sensor module 700, lighting power module 600, or duplex power and communications module 500. This keeps the 12 V DC power supply in a confined area and prevents the introduction of additional noise in the other modules. The preferred embodiment also contains a single switch/sensor module 700, lighting power module 600, and duplex power and communications module 500, along with a coaxial tap 900 that outputs, for example, video signals that are transmitted along coaxial wire 34. However, not all of these modules must necessarily be installed in each integrated outlet 20, or more than one module could be installed in a particular integrated outlet 20. Thus, if only one module were used, for example, duplex power and communications module 500, the uninterruptable power supply module 800 could be located within the duplex power and communications module 500.

However, for safety reasons and also standardization, each of these modules are kept separate. Thus, if one of the modules fails, it is an easy matter to replace the single module with its standardized replacement.

Each of the modules will be described individually. Before this description, the supporting structure of integrated outlet 20 will be described.

FIG. 2 illustrates that enclosure 50. In use, enclosure 50 is initially attached to a wall stud using side holes 54 or to a wall using back holes 56. Once enclosure 50 is mounted, ribbon cable 22 can be inserted so that it passes through each enclosure 50. Enclosure 50 can be made of metal, molded plastic or some other material. Molded plastic is preferred to minimize the chance of an electrical short.

Figure 3B:
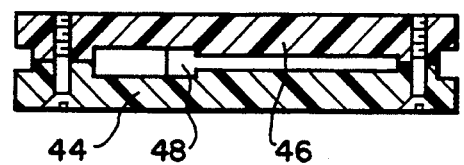
FIGS. 3A and 3B illustrate the tap of the integrated outlet according to the present invention.
Figure 3A:
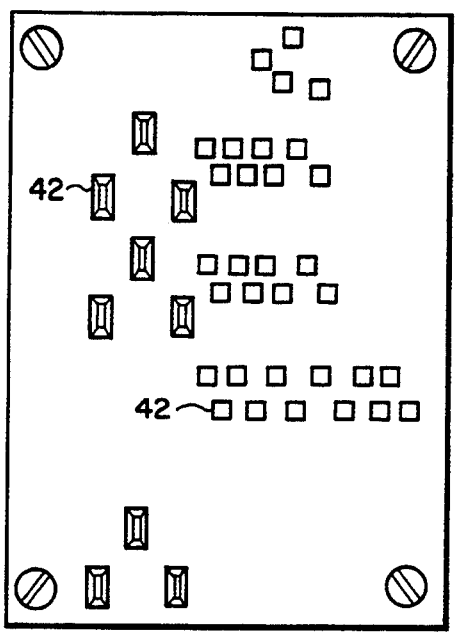

Tap 40, illustrated in FIGS. 3A and 3B, is made up of a front panel 44 and rear panel 46 that are connected by screws so that ribbon cable 22 fits into opening 48. Tap 40 is made of an insulating material. The various pin insert holes 42 have sizes that correspond to the cross sectional area of the pins that they will receive. One example of locations for pin insert holes 42 are shown in FIG. 3A. These locations correspond to the location of the module pins described in detail hereinafter.

Tap 40 slidably inserts into enclosure 50. Thus, after uninterruptable power supply module 800, switch/sensor module 700, lighting power module 600, or duplex power and communications module 500 are inserted into tap 40, their later removal from tap 40 is possible because tap 40 is firmly held in position. For example, tap 40 can be screwed into back wall 52 of enclosure 50. However, if tap 40 is defective for some reason, the various modules can be removed, it can be slid out of enclosure 50, and a new tap 40 can be placed on ribbon cable 22 and reinserted in enclosure 50.

FIG. 2 also shows that faceplate 60 is mounted with screws over the coaxial tap 900 and duplex power and communications module 500 to keep these modules, which will be exposed, within enclosure 50.

Figure 5A:
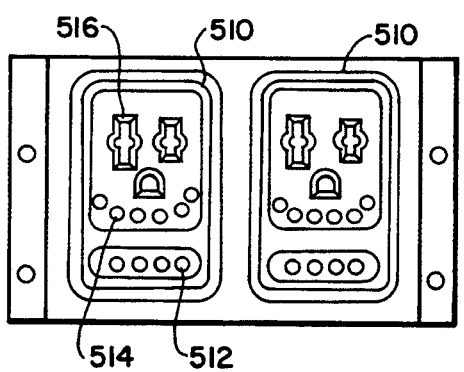
Figure 5B:
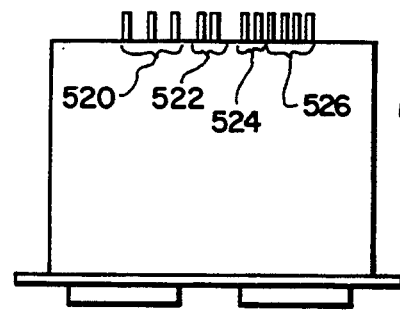
Figure 5C:
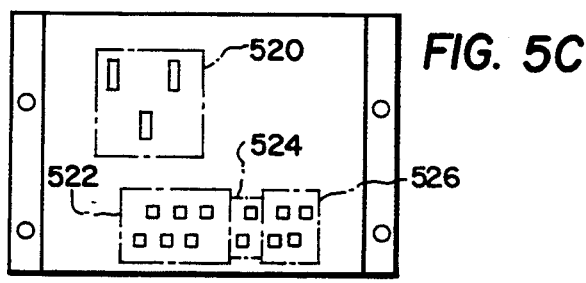

FIGS. 5A–5C show the front, top, and back views, respectively, of duplex power and communications module 500. The exterior of duplex power and communications module 500 is preferably made of an insulating material such as molded plastic. As shown in FIG. 5A, two receptacles 510 allow connection of an external appliance that requires electrical power, control communications, or telecommunications. On each receptacle 510 are telecommunications outlet 512, control communications outlet 514 and power outlet 516. Each outlet contains contacts that allow electrical contact between the appliance plug and the outlet. Various configurations of telecommunications outlet 512, control communications outlet 514, and power outlet 516 can be made.

FIG. 5B illustrates the various pin connections. Power pins 520 insert into pin insert holes 42 of tap 40 shown in FIG. 3A that correspond to the 120 V AC conductors. Control communication pins 522 correspond to the pin insert holes 42 of tap 40 for control communications. DC power pins 524 correspond to the pin insert holes 42 of tap 40 for 12 V DC power. Telecommunication pins 526 correspond to the pin insert holes 42 of tap 40 for telecommunications. FIG. 5C illustrates the location of the various pins from the back of duplex power and communications module 500.

FIG. 5D illustrates the electrical paths that exist within duplex power and communications module 500 from ribbon cable 22 to receptacles 510 for transmission of the various signals. Conductive paths from gauge wires 24 to power outlet 516 do not exist until relay 530 closes. Relay 530 will typically be a mechanical relay that closes when it receives a predetermined command signal from a data transfer circuit 532, which is preferably an integrated circuit chip. This predetermined command signal could be generated, in a very simple form, for any appliance that has a plug. For example, the act of inserting the appliance plug into power outlet 516 could cause a command signal that would result in the generation of the predetermined command signal.

Data transfer circuit 532 receives power from uninterruptable power supply module 800, described in detail hereinafter, and emits the close signal if proper condition exists when a request for 120 V AC power is made. Unless these conditions exist, power will not be supplied to power outlet 516.

Data transfer circuit 532 inputs control communications signals from control communications wires 32, which will typically be in digital form. These control communications signals correspond to the low speed digital data described in pending U.S. Pat. No. 4,899,217. The contents of this patent are incorporated by reference into this disclosure. This patent describes the type of control system that can be used with data transfer circuit 532.

Data transfer circuit 532 can output control communications signals received to control communications outlet 514 so that they are input into an appliance connected to the receptacles 510 and also output control communications signals from the appliance to ribbon cable 22.

Data transfer circuit 532 could receive highly complex communication inputs, or very basic inputs and the construction of data transfer circuit 532 will depend on the sophistication of the system.

Also illustrated in FIG. 5D is the direct connection established between telephone line 28 and telephone line 30 and telecommunications outlet 512. Thus, an output for telephone communications exists in duplex power and communications module 500.

Figure 6A:
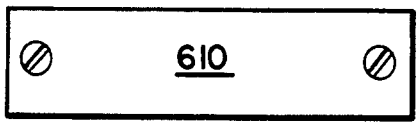
FIGS. 6A-6C illustrate the lighting power module of the integrated outlet according to the present invention.
Figure 6B:
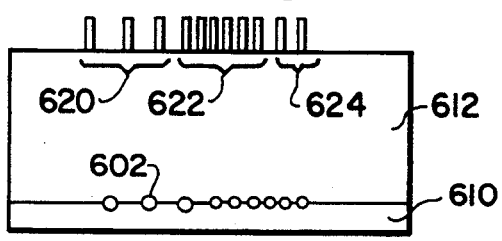
Figure 6C:
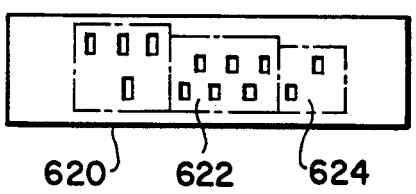

FIGS. 6A–6C illustrate the front, top, and back view of lighting power module 600. As shown in FIGS. 6B and 6C, pins 620, 622, and 624 correspond to pins 520, 522, and 524, respectively.

Lighting power module 600 operates electrically like duplex power and communications module 500, but rather than having receptacles 510 that allows the plug in of an appliance, outputs the power and control communications signals to external wiring such as lighting ribbon cable 602 shown in FIGS. 2 and 6B. It should be noted that although the this module is termed a "lighting" power module, it can be used to control any type of device that will typically be hardwired to power or communications.

FIG. 6A illustrates a front plate 610 that attaches, preferably with screws, the housing 612 of lighting power module 600, both of which are preferably made of molded plastic. Lighting ribbon cable 602 is disposed between front plate 610 and housing 612 and electrical contact to lighting ribbon cable 602 is established similarly as that described with reference to tap 40 in FIG. 3. Lighting ribbon cable 602 can then be run to an external outlet for communications, power, or telecommunications.

Dimming capability, obtained by varying the 120 V AC power output, can be obtained by substituting a triac or electronic thryistor for the relay 530 shown in FIG. 5D. Control signals can then control the triac or electronic thryistor. This same triac or thryistor could be substituted for relay 530 in FIG. 5D to obtain a dimming receptacle. However, this functionality, which would allow, for instance, a dimming table lamp to be plugged into the receptacle, would cause confusion between receptacles not containing the dimming function. Thus, this feature has not been incorporated into the preferred embodiment.

In the embodiment shown, telecommunications signals from telephone line 28 and telephone line 30 shown in FIG. 4 are not transferred to lighting ribbon cable 602, but, if desired, this could be done.

Figure 7A:
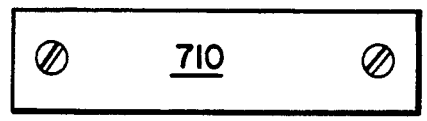
FIGS. 7A-7C illustrate the switch/sensor module of the integrated outlet according to the present invention.
Figure 7B:
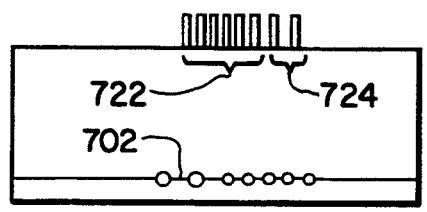
Figure 7C:
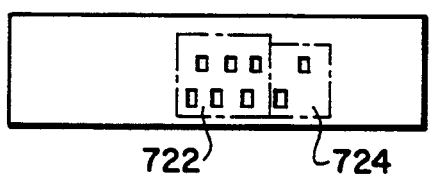

FIGS. 7A–7C illustrate the front, top, and back views of switch/sensor module 700. Switch/sensor module 700 operates like lighting power module 600, except that it cannot receive 120 V AC power. Thus, as shown in FIGS. 7B and 7C, only control communication pins 722 and DC power pins 724 are used for attachment to ribbon cable 22. Switch/sensor module 700 is used for switches that can control lighting, ceiling fans, or many other appliances, and also for various types of sensors. Because 120 V AC power cannot be received, a much safer environment is obtained because frequently used switches attached through switch/sensor module 700 cannot develop a 120 V AC short.

FIG. 7A illustrates that front plate 710 and housing 712 are identical in function to front plate 610 and housing 612 shown in FIGS. 6A and 6B and establish electrical connection with external wiring such as switch/sensor ribbon cable 702, which is shown in FIGS. 2 and 7B. Switch/sensor ribbon cable 702 can then be run to switches or sensors or other appliances not requiring 120 V AC power as necessary.

Figure 8A:
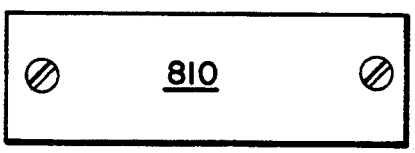
FIGS. 8A-8D illustrate the uninterruptable power supply module of the integrated outlet according to the present invention.
Figure 8B:
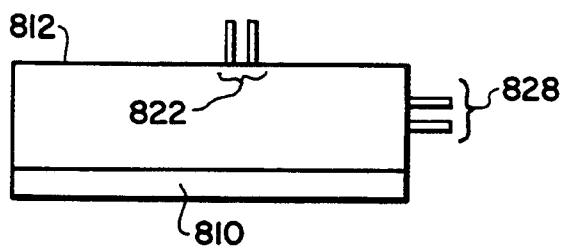
Figure 8C:
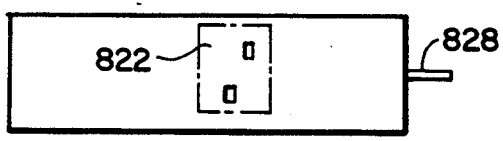

The front, top, and back views shown in FIG. 8A–8C of uninterruptable power supply module 800 show that a front plate 810 covers an open front of housing 812. 12 V DC power pins 822 input 12 V DC power from ribbon cable 22 and 5 V DC power is output to pins 828 so that 5 V DC power can be supplied to the other modules. Only these pins are necessary because the only purpose of uninterruptable power supply module 800 is to provide constant 5 V DC power to data transfer circuit 532 or its equivalent in switch/sensor module 700 and lighting power module 600. However, if ribbon cable 22 contains a lower DC voltage or if the other modules were of such simple construction that they did not require external power for their operation, uninterruptable power supply module 800 could be eliminated.

Uninterrupted power exists because the 12 V DC line has attached to it at some point a rechargeable battery that supplies 12 V DC power in case of a power failure to the 12 V DC generator.

Figure 8D:
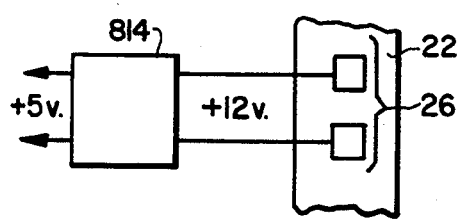

FIG. 8D illustrates that uninterruptable power supply module 800 contains a 12 V DC to 5 V DC convertor 814. Convertor 814 could also be made to convert voltages higher or lower than 12 V DC to some voltage other than 5 V DC. Such a convertor is well known. However, the placement of convertor 814 in a separate unit that will only supply 5 V DC power to modules that are located very close to uninterruptable power supply module 800 further contributes to the safety of the integrated outlet 20.

Figure 9A:
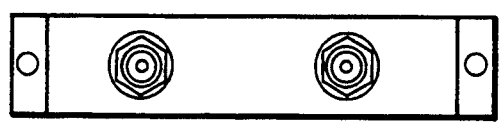
FIGS. 9A-9C illustrate the coaxial tap of the integrated outlet according to the present invention.
Figure 9B:
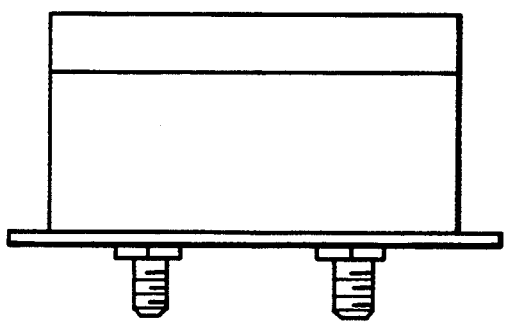
Figure 9C:
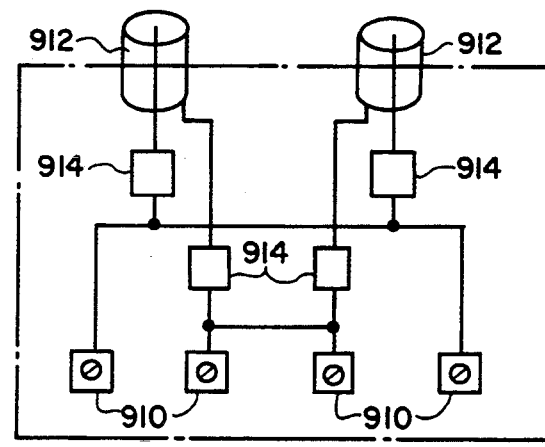

FIGS. 9A–9C illustrate the coaxial tap 900 that allows the output of the signal transmitted along the coaxial wire 34 of ribbon cable 22 shown in FIG. 4. Due to the difficulty of inserting pins into coaxial wire 34 and still having desired dielectric properties, connection of coaxial wire 34 to coaxial tap 900 requires cutting coaxial wire 34, exposing the ends of each conductor, and attaching the exposed ends to coaxial tap 900. FIG. 9C shows an attachment to screws 910, although other types of attachments could be made. With proper attachment, the transmitted signal will be output through coaxial outlets 912 and also continue along coaxial wire 34 of ribbon cable 22.

Passive transformers 914 disposed in the electrical path within coaxial tap 900, as shown in FIG. 9C, perform the function of signal attenuation and prevents signal reflection from the connector when no device is plugged into outlets 912.

Figure 10A:
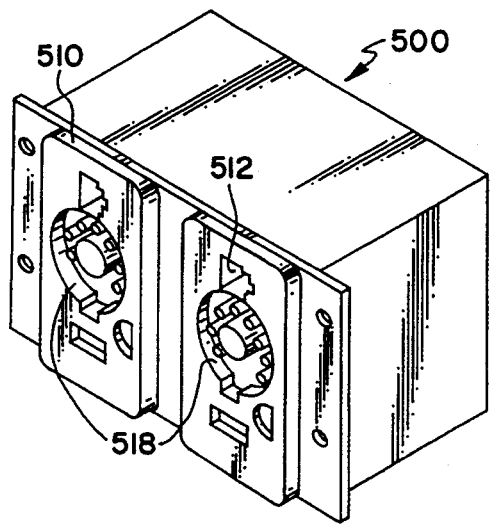
FIGS. 10A-10B illustrate another embodiment of the duplex power and communication receptacle of the integrated outlet according to the present invention.
Figure 10B:
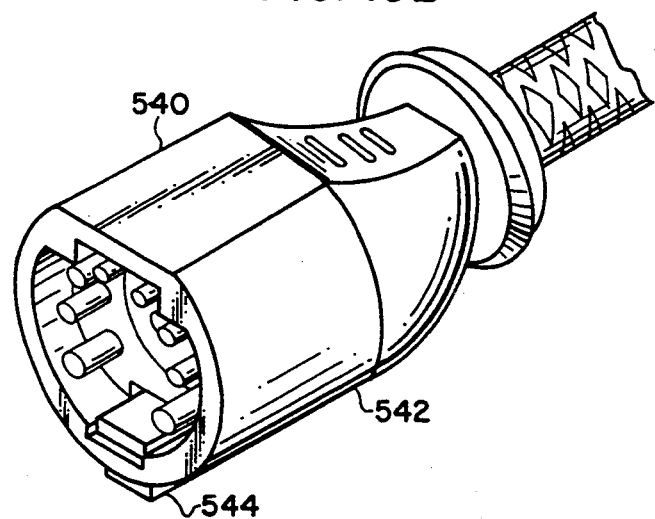

FIG. 10 illustrates an alternate embodiment for receptacles 510 of duplex power and communications module 500 that were shown in FIG. 5A. In the alternate embodiment, receptacles 510 contains a telecommunications outlet 512 that allows the insertion of a standard telephone extension cord. The combination power and command communications outlet 518 is adapted for a plug 540 shown in FIG. 10B that can be easily and exactly inserted. This is especially advantageous in hard to reach locations, such as behind a bookcase, and also for handicapped people. Furthermore, alignment of plug 540 requires alignment of plug outer housing 542, due to projecting portion 544, the individual pins can be made smaller than normally, and, therefore, at a lower cost.

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. An apparatus for establishing electrical connections to at least one of an appliance having an appliance plug, external power wiring, and external switch wiring from a cable containing power conductors that transmit electrical power, and command communications conductors which transmit data packets, each data packet containing a unique address and at least one of a predetermined plurality of command communications signals, said plurality of command communication signals including a predetermined relay command signal, comprising:

an enclosure;

means disposed at least partially in said enclosure for holding said cable; and first modular means detachably connected to said holding means for conducting said electrical power to said appliance comprising:

receptacle means containing electrical contacts adaptable for insertion of said appliance plug; and means for transmitting said electrical power using a first plurality of conductors to said receptacle means, said transmitting means including:

means for decoding said address in each transmitted data packet to detect a corresponding address; and first relay means for completing an electrical path between said first plurality of conductors and said receptacle means upon receipt of a first data packet containing said predetermined relay command signal and said corresponding address.

2. An apparatus according to claim 1 further comprising second modular transmitting means, detachably connected to said holding means, for transmitting said electrical power and command communications signals to said external power wiring, said second modular transmitting means including second relay means for completing an electrical path between one of said power conductors and said external power wiring upon receipt of another predetermined relay command signal.

3. An apparatus according to claim 2 further comprising third modular means, detachably connected to said holding means, for conducting said command communications signals from said cable to said external switch wiring.

4. An apparatus according to claim 3 wherein:

said holding means comprises an insulator material containing an opening for said cable and a plurality of holes; and said first, second, and third modular means each further comprise a plurality of pins insertable into said plurality of holes in said holding means thereby establishing electrical contact with said cable.

5. An apparatus for establishing electrical connections to at least one of an appliance having an appliance plug, external power wiring, and external switch wiring from a cable containing power conductors that transmit electrical power and command communications conductors that transmit data packets, each data packet containing a unique address and at least one of a predetermined plurality of command communications signals, said plurality of command communication signals including a predetermined relay command signal, comprising:

an enclosure;

means disposed at least partially in said enclosure for holding said cable; and first modular means detachably connected to said holding means for conducting said power and command communication signals to said appliance comprising:

receptacle means containing electrical contacts adaptable for insertion of said appliance plug; and means for transmitting said electrical power using a first plurality of conductors and command communications signals using a second plurality of conductors, respectively, to said receptacle means, said transmitting means including:

means for decoding said address in each transmitted data packet to detect a corresponding address;

first relay means for completing an electrical path between said first plurality of conductors and said receptacle means upon receipt of a first data packet containing said predetermined relay command signal and said corresponding address; and means for transmitting at least one of said command communication signal other than said predetermined relay signal to said receptacle means.

6. An apparatus according to claim 5 further comprising second modular transmitting means, detachably connected to said holding means, for transmitting said electrical power and command communications signals to said external power wiring, said second modular transmitting means including second relay means for completing an electrical path between one of said power conductors and said external power wiring upon receipt of another predetermined relay signal.

7. An apparatus according to claim 6 further comprising third modular means, detachably connected to said holding means, for conducting said command communications signals from said cable to said external switch wiring.

8. An apparatus according to claim 7 wherein:

said holding means comprises an insulator material containing an opening for said cable and a plurality of holes; and said first, second, and third modular means each further comprise a plurality of pins insertable into said plurality of holes in said holding means, thereby establishing electrical contact with said cable.

9. An apparatus according to claim 5 wherein one of said command communication signals other than said predetermined relay signal is transmitted to said receptacle for use by said appliance.

10. An apparatus for establishing electrical connections to at least one of an appliance having a plug, an external power ribbon cable, and an external switching ribbon cable from a central ribbon cable containing power conductors that transmit electrical power, and command communications conductors that transmit data packets, each data packet containing a unique address and at least one of a predetermined plurality of command communications signals, said plurality of command communication signals including a predetermined relay command signal, comprising:
   an enclosure;
   means disposed at least partially in said enclosure for holding said central ribbon cable substantially flat; and
   first modular means detachably connected to said holding means for conducting said power and command communication signals to said appliance comprising:
      receptacle means containing electrical contacts adaptable for insertion of said appliance plug; and
      means for transmitting said electrical power using a first plurality of conductors and command communications signals using a second plurality of conductors to said receptacle means, said transmitting means including:
         means for decoding said address in each transmitted data packet to detect a corresponding address; and
         first relay means for completing an electrical path between said first plurality of conductors and said receptacle means upon receipt of a first data packet containing said predetermined relay command signal and said corresponding address;
         means for transmitting a at least one of said command communication signals other than said predetermined relay signal to said receptacle means.

11. An apparatus according to claim 10 further comprising second modular transmitting means, detachably connected to said holding means, for transmitting said electrical power and command communications signals to said external power ribbon cable, said second modular transmitting means including second relay means for completing an electrical path between said power conductor and said external power ribbon cable upon receipt of another predetermined relay signal.

12. An apparatus according to claim 11 further comprising third modular means, detachably connected to said holding means, for conducting said command communications signals from said central ribbon cable to said external switching ribbon cable.

13. An apparatus according to claim 12 wherein:
   said holding means comprises an insulator material containing an opening for said cable and a plurality of holes; and
   said first, second and third modular means each further comprises a plurality of pins that fit into said plurality of holes in said holding means and establish electrical contact with said cable.

14. An apparatus for establishing electrical connections to an appliance having an appliance plug from a cable containing power conductors, and command communications conductors that transmit electrical power and command communications signals that include predetermined relay signals, respectively, comprising:
   an enclosure;
   means disposed at least partially in said enclosure for holding said cable substantially flat, said holding means containing a flat front surface with a plurality of holes in a predetermined spaced relation and a side surface with an opening for said cable; and
   first modular means detachably connected to said front surface of said holding means for conducting said power and command communication signals to said appliance comprising;
      an enclosed housing formed substantially of an insulating material having a front face and a rear face;
      a plurality of conductive pins including power pins and command signal pins protruding substantially in parallel from said rear face of said housing and insertable into said holes of said holding means, thereby establishing electrical contact with said cable,
      receptacle means disposed on said front face of said housing and containing a first electrical plug site, said first electrical plug site including a plurality of electrical contacts adaptable for insertion of said appliance plug, and
      transmitting means, disposed within said enclosed housing and connected between said plurality of conductive pins and said electrical contacts, for transmitting said electrical power and command communication signals, respectively, to said receptacle means, said transmitting means including first relay means for completing an electrical path between said one of said power pins and one of said electrical contacts of said first electrical plug site upon receipt of one of said predetermined relay signals.

15. An apparatus according to claim 14 wherein:
   said receptacle means further includes second electrical plug sites, said second electrical plug sites including a plurality of electrical contacts adaptable for insertion of one of said appliance plugs so that two appliances can be simultaneously plugged into said receptacle means; and
   said transmitting means further includes second relay means for completing an electrical path between one of said power pins and one of said electrical contacts of said second electrical plug site upon receipt of one of said predetermined relay signals.

16. An apparatus for establishing electrical connections to at least one of an appliance having an appliance plug, external power wiring, and external switch wiring from a ribbon cable containing power conductors, and command communications conductors that transmit electrical power and command communications signals that include predetermined relay signals, respectively, comprising:
   means for holding said ribbon cable substantially flat, said holding means having a front surface with a plurality of holes and a side surface with an opening for insertion of said cable; and
   first modular means detachably connected to said front surface of said holding means for conducting said power and command communication signals to said appliance comprising;

an enclosed housing formed substantially of an insulating material having a front face and a rear face;

receptacle means disposed on said front face of said housing and containing first and second electrical plug sites, each of said first and second electrical plug sites including a plurality of electrical contacts adaptable for insertion of said appliance plug;

a plurality of conductive pins including power pins and command signal pins protruding substantially in parallel from said rear face of said housing and insertable into said holes of said holding means, thereby establishing electrical contact with said cable, and transmitting means, disposed within said enclosed housing and connected between said plurality of conductive pins and said electrical contacts, for transmitting said electrical power and command communication signals, respectively, to said first and second electrical plug sites of said receptacle means, said transmitting means including first and second relay means for completing an electrical path between said one of said power pins and one of said electrical contacts associated with said first and second electrical plug sites, respectively, upon receipt of one of said predetermined relay signals.

17. An apparatus according to claim 16 wherein said transmitting means comprises a transfer circuit means, which inputs said predetermined relay signals, for causing closure of said first and second relay means and thereby completing said electrical path between said one of said power pins and one of said electrical contacts associated with said first and second electrical plug sites.

18. An apparatus for establishing electrical connections to at least one of an appliance having a plug, an external power ribbon cable, and an external switching ribbon cable from a central ribbon cable containing power conductors that transmit electrical power and command communications conductors that transmit data packets, each data packet containing a unique address and at least one of a predetermined plurality of command communications signals, said plurality of command communication signals including a predetermined relay command signal, comprising:

an enclosure;

means disposed at least partially in said enclosure for holding said central ribbon cable substantially flat; and first modular means detachably connected to said holding means for conducting said power to said appliance comprising:

receptacle means containing electrical contacts adaptable for insertion of said appliance plug; and means for transmitting said electrical power using a first plurality of conductors to said receptacle means, said transmitting means including:

means for decoding said address in each transmitted data packet to detect a corresponding address; and first relay means for completing an electrical path between said first plurality of conductors and said receptacle means upon receipt of a first data packet containing said predetermined relay command signal and said corresponding address.

19. An apparatus according to claim 18 further comprising second modular transmitting means, detachably connected to said holding means, for transmitting said electrical power and command communications signals to said external power ribbon cable, said second modular transmitting means including second relay means for completing an electrical path between said power conductors and said external power ribbon cable upon receipt of another predetermined relay command signal.

20. An apparatus according to claim 19 further comprising third modular means, detachably connected to said holding means, for conducting said command communications signals from said central ribbon cable to said external switching ribbon cable.

21. An apparatus according to claim 20 wherein:

said holding means comprises an insulator material containing an opening for said central ribbon cable and a plurality of holes; and said first, second and third modular means each further comprises a plurality of pins that fit into said plurality of holes in said holding means and establish electrical contact with said central ribbon cable.

22. An apparatus for establishing electrical connections to at least one of an appliance having an appliance plug, external power wiring, and external switch wiring from a cable containing power conductors that transmit electrical power and a source of command communications signals transmitted in data packets containing an address, said command communications signals including a predetermined relay command signal, comprising:

an enclosure;

means disposed at least partially in said enclosure for holding said cable; and first modular means detachably connected to said holding means for conducting said power and command communications to said appliance comprising:

receptacle means containing electrical contacts adaptable for insertion of said appliance plug;

means for receiving data packets, each data packet containing a unique address and at least one of a predetermined plurality of command communications signals, said plurality of command communication signals including a predetermined relay command signal; and means for transmitting said electrical power using a first plurality of conductors and command communications signals using a second plurality of conductors, respectively, to said receptacle means, said transmitting means including:

means for decoding said address in said transmitted data packets to detect a corresponding address;

first relay means for completing an electrical path between said first plurality of conductors and said receptacle means upon receipt of a first data packet containing said predetermined relay command signal and said corresponding address; and means for transmitting at least one command communication signal other than said predetermined relay signal to said receptacle for use by said appliance upon receipt of a second data packet containing said corresponding address and said at least one command communication signal other than said predetermined relay signal.

23. An outlet apparatus including a first module and adaptable for inclusion of a second module for establishing electrical connections to an appliance having an appliance plug containing power conductors, and command communications conductors that transmit electrical power and command communications signals including predetermined relay signals, respectively, comprising:

a ribbon cable holder made substantially from molded plastic that encloses a substantially flat portion of said ribbon cable, said holder including:

a back side with an opening therethrough for insertion of said cable, said back side including a front surface containing at least first and second sets power connections and first and second communication connections, each power connection and each communication connection including a plurality of receptacle sites each corresponding in location to a respective one of said power conductors and said command communication conductors and permitting electrical connection therebetween, each first power connection and first communication connection disposed on a different half of said back side of said holder than said second power connection and second communication connection; and a plurality of side walls extending from an outer perimeter of said back side of said holder, said side walls therefore defining an enclosed space and a front side of said holder; and a first module detachably connected to said front surface of said back side of said holder comprising:

an enclosed housing formed substantially of molded plastic having a front face and a rear face for insertion into a portion of said enclosed space of said holder such that, upon insertion:

one of said first and second power connections and one of said first and second communication connections are left exposed for possible insertion of said second module into a remaining portion of said enclosed space of said holder; and said front face of said enclosed housing is substantially flush with said front side of said holder;

a conventional receptacle and a communication receptacle disposed on said front face of said housing, said conventional receptacle containing conventional receptacle sites and said communication receptacle containing communication receptacle sites adaptable for insertion of said appliance plug;

a plurality of conductive pins including power pins and command signal pins protruding substantially in parallel from said rear face of said housing and insertable into said receptacle sites of one of said first and second power and communication connections to establish electrical contact with said cable, and transmitting means, disposed within said enclosed housing and connected between said plurality of conductive pins and said conventional and communication receptacle sites for transmitting said electrical power and command communication signals, respectively, to said conventional and communication receptacles, respectively, said transmitting means including a relay for completing an electrical path between said power pins and said conventional receptacle sites upon receipt of one of said predetermined relay signals.

24. An outlet apparatus according to claim 23 further comprising a cover plate attachable to said front side of said cover for covering said enclosed space, said cover plate containing an open portion through which a portion of said front face of said first module can protrude.

* * * * *